US006617386B2

(12) United States Patent
Lelli et al.

(10) Patent No.: US 6,617,386 B2
(45) Date of Patent: Sep. 9, 2003

(54) STRUCTURAL FINISH

(75) Inventors: David A. Lelli, West Kingston, RI (US); Chander Patil, Burlington, MA (US)

(73) Assignee: Dryvit Systems, Inc., West Warwick, RI (US)

( * ) Notice: Subject to any disclaimer, the term of this patent is extended or adjusted under 35 U.S.C. 154(b) by 0 days.

(21) Appl. No.: 09/912,999

(22) Filed: Jul. 25, 2001

(65) Prior Publication Data

US 2003/0055147 A1 Mar. 20, 2003

(51) Int. Cl.⁷ .............................. C08J 3/00; C08K 3/34; C08K 9/00; C08L 9/06
(52) U.S. Cl. ....................................... 524/445; 523/200
(58) Field of Search ........................... 524/445; 523/200

(56) References Cited

U.S. PATENT DOCUMENTS

| 3,617,321 A | 11/1971 | Kent |
|---|---|---|
| 4,155,887 A | 5/1979 | Hetson |
| 4,525,388 A * | 6/1985 | Rehder et al. |
| 4,882,888 A | 11/1989 | Moore |
| 5,422,143 A | 6/1995 | Yiu |
| 6,103,003 A | 8/2000 | Ledbetter |

FOREIGN PATENT DOCUMENTS

WO    WO 98/27027    6/1998

* cited by examiner

*Primary Examiner*—Patrick D. Niland
(74) *Attorney, Agent, or Firm*—Fay, Sharpe, Fagan, Minnich & McKee, LLP

(57) ABSTRACT

A textured finish composition is disclosed wherein the composition comprises an acrylic latex/binder and an aggregate to form a textured composition. The aggregate is preferably a lightweight expanded mineral that has a density and weight that is less than sand. The expanded mineral is preferably silicone encapsulated in order to avoid the absorption of water. Most preferably, silicone encapsulated perlite is used as an aggregate for the textured finish composition. In one preferred embodiment, the textured finish composition comprises an acrylic binder and silicone encapsulated expanded perlite.

24 Claims, No Drawings

STRUCTURAL FINISH

FIELD OF THE INVENTION

The present invention relates to a structural finish. In particular, the present invention relates to a textured finish composition for the exterior of a building or structure. More particularly, the present invention relates to the incorporation of a unique aggregate within a finish composition which exhibits desired physical properties, including durability and textured appearance.

BACKGROUND OF THE INVENTION

Many factors are important in choosing an exterior surface of a building or structure, for example, the durability and appearance of the finish. There are a limited number of materials which possess the proper physical characteristics to allow their application to the exterior of a building, these materials include: brick, aluminum siding, wood siding, concrete and premixed acrylic finishes such as a DRYVIT® style of finish.

The most typical exterior surfaces of buildings and structures are brick and siding. While brick exteriors have the advantage of being durable, a brick exterior is also very costly, which can be a deterrence. Siding is not as durable as brick and has the disadvantage of requiring a relatively higher amount of maintenance, for example, cleaning and painting.

In addition, traditional exterior finishes have the disadvantage of being difficult to repair. For example, in order to repair damage to a brick exterior, the replacement brick must "match" the standing brick.

A DRYVIT® style of finish, on the other hand, is a relatively new type of finish that has the advantage of good durability and a relatively low cost with minimal maintenance. For example an insulating layer is covered by a base coat embedding a fiberglass mesh, which is then covered by the finish coat. These types of finishes are typically applied using a trowel. One advantage of a DRYVIT® finish over the traditional brick exterior is the possibility of creating a custom color for the exterior surface, unlike brick, where there is a relatively small choice in colors.

DRYVIT® finishes are manufactured by Dryvit Systems, Inc. One advantage of a DRYVIT® finish is that there are several textured finishes offered for the Exterior Insulation and Finish Systems ("EIFS") market. The finishes are premixed acrylic coatings that are offered in standard colors as well as custom colors. By varying the grade (coarse to fine) and by varying the amount of aggregate in the finish, different types of textures are provided. These different types of textures provide an aesthetically pleasing exterior to a consumer depending on individual tastes. These premixed finishes can be applied over properly prepared substrates such as exterior masonry, stucco, pre-cast or cast-in place concrete, and other approved substrates.

The finishes are typically supplied in 5-gallon pails and weigh about 68–70 pounds per pail. The heavy weight of the pails slows down the productivity of the workers during application of the finish.

It is therefore desirable to have a lightweight textured finish that retains the appearance and durability characteristics of existing textured finishes. It is further desirable for the finish to be such that it can easily be applied to an interior and/or exterior surface, providing uniform durable coverage having the look and feel of the desired texture. It is still further desirable that such a finish be available in various colors. Still further, it is desirable that repairs can be made to the underlying substrate and then the textured finish applied to the repaired area to blend with previously coated adjacent textured areas. Such an improved finish should be able to be applied using conventional methods, such as trowel application or spray application using a hopper gun or pole gun-type sprayer.

SUMMARY OF THE INVENTION

In one aspect of the present invention, a finish composition formed of a resin dispersion and an aggregate that has a water resistant coating is provided.

In another aspect of the present invention, the finish composition is formed of a resin dispersion including an aggregate having a water resistant coating, where the aggregate is perlite, hyperlite, vermiculite, fly ash, expanded clay, pumice stone powder and mixtures thereof.

In yet another aspect of the present invention, the resin is selected from styrene-butadiene, polyvinyl acetate, acrylic and mixtures thereof.

In still another aspect of the present invention, a finish composition is provided that includes titanium dioxide, calcium carbonate, silicates and/or water.

In a further aspect of the present invention, the invention is directed to a finish composition with about 4% to about 10% by weight of a lightweight aggregate, about 10% to about 30% by weight of a resin dispersion, less than about 10% by weight water, and the remainder including additional filler and/or aggregate materials.

Advantages of the present invention will become readily apparent to one skilled in the art upon a reading and understanding of the present disclosure.

DETAILED DESCRIPTION OF THE PREFERRED EMBODIMENT(S)

In accordance with aspects of a preferred embodiment, a textured finish composition is disclosed which includes a lightweight aggregate. The textured finish composition includes a polymeric resin dispersion and an aggregate.

The finish compositions of the present invention include at least one resin dispersion. A resin dispersion as defined in the present invention is intended to embrace those water soluble and water dispersible film-forming resins conventionally employed in finish compositions. These include aqueous colloidal dispersions of polymers from the polymerization of monomers such as acrylic acid, methacrylic acid, methylmethacrylate, ethylmethacrylate, ethylhexylacrylate, tetrafluoroethylene, chlorotrifluoroethylene, vinylidene fluoride, butadiene-1-3, isoprene, chloroprene, styrene, nitrites, acrylamide, vinyl alcohol, methacrylamide, acrylonitrile, vinyl chloride, vinyl acetate, vinylidene chloride, ethylene, propylene and isobutylene; drying oil fatty acid compounds such as tuna oil, linseed oil, soybean oil, dehydrated castor oil, cottonseed oil, poppyseed oil, safflower oil, and sunflower oil; fatty acids derived from drying oils; partially polymerized drying oils such as partially polymerized linseed oil; oxidized drying oils such as oxidized soybean oil, synthetic drying oils obtained by the esterification of fatty acids with polyhydric alcohols (e.g., glycerol pentaerythritol, mannitol and sorbitol); drying oil—alkyd resins of the type obtained by reacting a drying oil fatty acid with polyhydric alcohol and a polycarboxylic acid such as maleic anhydride, fumaric acid, phthalic acid, adipic acid, sebacic acid, and the like; the polysufides, epoxides, amino resins such as urea-formaldehyde, melamine formaldehyde, nitrocellulose, ethyl cellulose, cellulose butyrate, chlorinated poly ethers, terpene resins, chlorosulfonated polyethylene natural rubber, organo siloxane polymers, as well as other film-forming binders employed in water based paints, as well as other film-forming binders employed in water based compositions for coatings.

Suitable commercially available polymeric coating formulations generally contain from about 40 to about 60 weight percent of an emulsified polymer and include, but are not limited to, natural rubber, styrene-butadiene copolymer, butadiene-acrylonitrile copolymers, polyvinyl chloride, polyvinyl acetate, copolymers of vinylidene chloride and acrylonitrile, polytetrafluoroethylene, ethylacrylate-methacrylate copolymers, butadiene-styrene-acrylonitrile copolymers, isobutylene-isoprene copolymers, acrylonitrilebutylacrylate-methacrylic acid copolymers, styrene-butylacrylonitrile, octyl acrylate and methacrylic acid, copolymers of methyl methacrylate, ethyl acrylate and ammonium methacrylate.

The aggregate is contemplated as being any particulate with a weight that is less than that of sand. Preferably, the aggregate comprises a lightweight particulate such as expanded minerals and others, having densities below about 0.31–1.33 grams per cubic centimeter. Such lightweight aggregates preferably contain air voids that displace volume and lower the bulk density.

The lightweight aggregates are selected to provide the fine texture required on the finished surface to resemble the historically used sand aggregate. The lightweight aggregate advantageously replaces at least a significant portion (e.g., greater than 60%) of the sand aggregate. Finishes according to the present invention will thus preferably have a greater amount of perlite on a volume basis than sand on a volume basis. In addition, for certain applications, the particulate is preferably chosen to be sufficiently small in size so as to pass through a hopper gun or pole gun-type sprayer.

Exemplary lightweight aggregates include perlite, vermiculite, hyperlite, expanded clay, pumice stone powder, fly ash, glass microballoons, glass bubbles, phenolic microballoons and extendospheres. Most preferably, the present invention utilizes perlite as the mineral component of the lightweight aggregate.

Preferably, a water resistant coating encapsulates the aggregate due to the typically porous nature thereof. The types of aggregates that are employed in the present invention, while exemplary in their lightweight nature, have a tendency to absorb water. Therefore, in order to avoid the absorption of water within the composition by the aggregate, a water-resistant coating is employed to avoid infiltration of water into the aggregate. Without a water-resistant coating, the porous nature of the aggregate could cause an increase in the viscosity of the finish. However, with the water-resistant coating, absorption of water by the aggregate is avoided, and an aggregate that performs similarly to sand is achieved. Suitable water-resistant coatings for the present invention include silicone and emulsions thereof.

A particularly preferred aggregate for the present invention is silicone coated perlite. Perlite is a generic name for naturally occurring siliceous volcanic rock. The distinguishing feature which sets perlite apart from other volcanic glasses is that when heated to a suitable point in its softening range, the product expands anywhere from four to twenty times its original volume. The expansion of perlite is due to the presence of two to six percent combined water in the crude perlite rock. When the crude ore is quickly heated to above 870° C. (1600° F.), the product pops, or explodes, as the combined water vaporizes and creates countless tiny bubbles. This accounts for the lightweight and other well-known exceptional properties of expanded perlite, including absorption ability and insulation values. This expansion process also creates perlite's white color, and the color of expanded perlite ranges from snowy white to grayish white.

Due to the fact that perlite is a natural glass, it is classified as chemically inert and has a pH of approximately 7. Expanded perlite can be manufactured to weigh from 40 kg/m$^3$ (2.5 lb/ft$^3$) to 170 kg/m$^3$ (10.5 lb/ft$^3$). In addition, perlite can be manufactured to various particle sizes depending on the needs for the specific use. A typical elemental analysis of perlite is shown is Table 1, while typical physical characteristics of perlite are described in Table 2:

TABLE 1

| Typical Elemental Analysis | |
|---|---|
| Silicon | 33.8 |
| Aluminum | 7.2 |
| Potassium | 3.5 |
| Sodium | 3.4 |
| Iron | 0.6 |
| Calcium | 0.6 |
| Magnesium | 0.2 |
| Trace | 0.2 |
| Oxygen (by difference) | 47.5 |
| Net Total | 97.0 |
| Bound Water | 3.0 |
| Total | 100.0 |

TABLE 2

| Typical Physical Analysis | |
|---|---|
| Color | White |
| Refractive Index | 1.5 |
| Free Moisture, Maximum | 0.5 |
| pH (of water slurry) | 6.5–8.0 |
| Specific Gravity | 2.2–2.4 |
| Bulk Density (loose Weight) | 2–25 lb/ft$^3$ (32–400 kg/m$^3$) |
| Mesh Size | 4–8 mesh and finer |
| Softening Point | 1600–2000° F. (871–1093° C.) |
| Fusion Point | 2300–2450° F. (1260–1343° C.) |
| Specific Heat | 0.2 Btu/lb °F. (387 J/kg · K) |
| Thermal Conductivity at 75° F. | 0.27–0.41 Btu · in/h ft$^2$ · °F. (0.04–0.06 W/m · K) |

Perlite is available in different grades ranging from fine to coarse material. Generally, the following perlite particle/texture relationships are available:

TABLE 3

| Perlite Particle Size | Degree of Texture |
|---|---|
| 0.0–0.2 mm | Very Fine or Non-Textured Finishes |
| 0.1–3.0 mm | Normal Textured Finishes |
| 1.5–6.0 mm | Very Bold Textures |

The present invention employs a silicone coating encapsulating the lightweight aggregate. Without an encapsulant, the aggregate of the present invention could absorb liquids from the final finish composition, leading to increased density of the composition. This absorption could cause the finish to become too thick for application.

The lightweight finish will also typically employ a sand aggregate. Important factors in determining the type of formulation to be used, i.e., how much sand and perlite, include gradation, particle shape, overall color and purity from rustable contaminants. Based on these factors and the desired physical characteristics of the finish, a specific grade of perlite replaces a certain amount and combination of sand aggregates. Advantageously, it has been shown that the lightweight perlite aggregate adequately withstands the shear force of mixing and troweling.

Perlite generally has a specific gravity of 2.34 grams/cubic centimeter or 19.5 pounds per gallon. Silica sands have a weight per gallon of about 22 pounds per gallon. Although there is not a great difference in the weight per gallon of perlite versus silica sands, perlite is beneficial to the finishes of the present invention because perlite has a bulk density of 5.0 to 8.0 pounds per cubic foot, whereas silica sands have a bulk density of over 90 pounds per cubic foot.

The difference in bulk density between perlite and silica sand is attributable to the physical characteristics of perlite. Each perlite grain encapsulates many tiny hollows of air. The solid areas of perlite are close in density to that of the silica sand, which is what is reported in the specific gravity. However, the hollow voids within each particle cause the weight of a given perlite particle to have an effective density of much less than that of a similarly sized silica sand grain. As such, the effective density of perlite is much less than that of silica sand, allowing a lower bulk density and allowing perlite to possibly replace from 5 up to 18 times its weight in sand.

The type of sand used in the lightweight finish is dependent on the desired coarseness of the finish. A medium sized grade for use in the present invention is about 1 to 2 millimeters in diameter. A fine coarse grade is considered to be about 0.5 to 1 millimeters in diameter.

A suitable and preferred perlite for use in finishes according to the present invention is silicone treated cryogenic perlite available from Grace Construction Products Canada, Inc., of Ajax, Ontario. The preferred silicone treated cryogenic perlite generally has a density in the range of 4.0–4.4 PCF with a water repellency from about 226–232 ml. Preferably, the density is 4.2 PCF and the water repellency is 230 ml. Alternatively, a silicone industrial heavyweight perlite from Grace can be used to achieve a coarser finish.

A method of coating perlite is disclosed in U.S. Pat. No. 3,769,065 to Dunn, herein incorporated by reference. Dunn discloses the moistening of expanded perlite particles with an acid prior to the application of a glass coating, which substantially eliminates problems associated with previous forms of finish perlite, such as sublimation or decomposition by excessive heat and high cost of the coating. In coating perlite, a preferred silicone is a water dilutable emulsion of polydimethyl siloxane, which is commercially available. Such a preferred silicone-coated perlite is disclosed in U.S. Pat. No. 4,525,388 to Rehder et al., also incorporated herein by reference. Various silicones may be used including organo-functional silanes having the general formula R—SiX$_3$ wherein R is selected from the group consisting of alkoxy and acetoxy such as acrylate, methacrylate, glycidoxy, epoxy, propoxy, epoxy cyclohexyl and vinyl and X is selected from the group consisting of halogen, alkoxy and acetoxy. These silicones are hydrophobic film forming compounds which are available in aqueous or organic solvent solution, emulsion or dispersion forms. Particularly, preferred silicone dispersions include water dilutable polydimethyl siloxane dispersions available from Dow Chemical Company under the designation Dow 347 and from General Electric Company under the designation G.E. SM-2138.

Lightweight finishes according to the present invention include a base formula that can interchangeably be used in multiple lightweight finishes and provides a major component of lightweight finishes according to the present invention. A generic base formulation is described in the following table:

TABLE 4

| Ingredient | Weight (lbs.) | Volume (gallons) |
|---|---|---|
| Water | 27.60 | 3.31 |
| Acrylic latex | 613.50 | 69.53 |
| Defoamer | 2.04 | 0.28 |
| Clay filler | 153.37 | 7.05 |
| TiO$_2$ Slurry | 102.25 | 5.31 |
| Biocide | 5.11 | 0.51 |
| Coalescent | 10.22 | 1.23 |
| Ethylene Glycol | 3.07 | 0.34 |
| Ammonia | 3.07 | 0.37 |
| Premix and add the following: | | |
| Water | 81.80 | 9.82 |
| Acrylic thickener | 20.45 | 2.25 |
| TOTAL | 1022.48 | 100.00 |

Some components included in compositions to form lightweight finishes according to the present invention are also commonly used in the paint and coatings industry, especially in latex paints, stucco and EIFS products. For example, acrylic latex is one of many commercially available acrylic polymers that are suitable for exterior coatings. Polymers for use in the present invention can have greater or lesser flexibility depending upon the desired properties of the final finish product. A highly flexible latex will provide, for example, an elastomeric finish.

A defoamer in accordance with the present invention is a liquid hydrocarbon for the control of the development of foam and air entrapment in the formulation. For example, Henkel Corporation of Gulph Mills, Pa., manufactures a commercially available defoamer, which consists of a silica filled polymethylsiloxane. Further examples of commercially available defoamers include products available from Crucible Chemical Company of Greenville, S.C.

Clay fillers in accordance with the present invention include fine china clay/aluminum silicate fillers. For example, Kaofine™ is a coating clay that is available from the Thiele Kaolin Company of Sandersville, Ga. In addition, other commercially available clay fillers are available from Huber Engineered Materials of Atlanta, Ga.

Coarse fillers in certain formulations of the present invention can be calcium carbonate or silica flour of a 200-mesh size or average of 75 microns. Such fillers are obtained from many suppliers, including U.S. Silica of Berkeley Spring, W. Va. and Georgia Marble of Kennesaw, N.J. In preferred forms of the present invention, however, a portion or all of the coarse filler is removed in favor of more of the base formula and more water in order to achieve a creamier rheology and a lower viscosity.

The textured coating compositions of the present invention may also include colored or white pigments including mineral products which can be used as fillers and extenders. Among the pigments suitable for incorporation in the present invention are the various water insoluble organic and inorganic paint pigments including by way of nonlimiting example, iron oxides, titanium dioxide, zinc oxide, phthalocyanine blue and green, lead chromate, barium sulfate, zinc sulfide, silica, calcium carbonate, chrome green, iron blues and magnesium silicate (talc). Pigment dispersing agents including tetrasodium pyrophosphate, lecithin, gum Arabic, sodium silicate, various water soluble soaps, aliphatic and aromatic sulfonates, the aliphatic sulfates, various polyethers and ether alcohol concentrates and the like may be added to enhance the dispersion of the pigments. For example, the titanium dioxide slurry employed in the present invention is a commercially available aqueous dispersion of titanium dioxide, which is a powder filler for whitening and hide. Slurry versions of titanium dioxide, which are preferred for the present invention, are available from DuPont of Wilmington, Del.

In addition, a biocide may be added to the composition in order to prevent spoilage. A biocide may be incorporated to prevent degradation by microorganisms and their by-product enzymes in defoamers, coalescing agents, dispersants, stabilizers and thickening agents used in aqueous paints and coatings. The addition of a biocide will contribute to preventing gas formation and foul odor, along with adverse effects on viscosity and stability. Examples of biocides that may be used in the present invention are DOWICIL® 75 and DOWICIL® QK-20 manufactured by The Dow Chemical Company. Other companies providing commercially available biocides include Troy Chemical of Hackensack, N.J. and CreaNova of Piscataway, N.J. Alternatively, a fungicide or a mildewcide may be included in the composition instead of or in addition to a biocide at about 0.1% by weight replacing water in the formulation. In this embodiment, the addition of a fungicide or mildewcide helps with resistance to fungal growth of the coating on the wall. Commercially available fungicides and mildewcides can be obtained from Troy Chemical, CreaNova and Rohm and Haas. Other biocides and fungicides include halogenated acetylene alcohols, diphenyl mercuric dodecenyl succinate, O-phenylphenol and its sodium salt, trichlorophenols and their sodium salts.

A coalescent that may be employed in the present invention is a solvent or combination of solvents that aid in the development and formation of a film by the polymer in the curing process of the coating. Common suppliers of coalescents are Eastman Chemical of Perth Amboy, N.J., Dow Chemical and Union Carbide. Other coalescing agents include diethylene-glycol ethyl ether, diethylene glycol ethyl ether acetate, hexylene glycol, and 2-butoxyethanol acetate.

Ammonia as used in the present invention is an industrial strength grade used to raise the pH of the formulation. Alternatively, other strong basic agents may be added in order to raise the pH of the formulation, for example, the addition of an amine.

The acrylic thickener is an alkali soluble emulsion used to thicken the final composition. Common suppliers of acrylic thickeners that can be used in the present invention are Rohm and Haas of Philadelphia, Pa. and Union Carbide of Somerset, N.J. Alternatively, a cellulosic material can be used as a thickening agent.

Additives of the type conventionally used in exterior and interior coating compositions may also be incorporated in the insulating textured finish of the present invention. These include freeze-thaw stabilizers such as ethylene glycol, propylene glycol, glycol ethers, alkali metal salts of N-coco beta amino butyric acid, poly-substituted phenolates, modified glyceryl monoricinoleate, urea and thiourea.

Another additive in accordance with the present invention is the addition of odorless mineral spirits in the manufacture of a lightweight finish, preferably by Ashland Chemical of Columbus, Ohio. This is a clear liquid solvent which is added in order to alleviate stickiness in application due to the replacement of silica sand with perlite in lightweight finishes. The addition of odorless mineral spirits lowers the surface tension of the coating which allows for a slower cure rate immediately after application to a surface.

Another aspect of the present invention lightweight finishes is the rheology of the finishes. Rheology refers to how the product flows and similar to the viscosity of the finish. Rheology is important because the lightweight finishes of the present invention are applied with a hawk and trowel. Therefore, the finish must have a certain workability and sag resistance that is typical for an EIFS coating. Preferably, lightweight finishes in accordance with the present invention have a viscosity in the range of about 90 to about 100 paste units (PU), whereas regular EIFS finishes not using lightweight aggregates achieve a viscosity of about 110 to about 120 PU. A "paste unit" is defined as a viscosity measurement made with a Stormer viscometer using a spindle with two thin bars extending from a central shaft. The PU designation is differentiated from the Krebbs Paddle (KU), which uses wider blades that extend from the center shaft and is used for measuring liquids in the viscosity range of most paints. The PU designation is further distinguished from readings from the Brookfield viscometer, which measures fluids in centipoises units.

EXAMPLE 1

Two formulations were manufactured for two different grades of EIFS finishes. One produced a small aggregate texture (Column A) whereas the other produced a coarser aggregate structure (Column C). Based on the two initial formulations, two lightweight finishes were formed, one producing a lightweight small aggregate texture (Column B) and one producing a lightweight coarser aggregate structure (Column D). The lightweight finishes replaced a majority of the heavy aggregate of the original grades, roughly 70% by weight, with a similar grade of silicone coated perlite.

The formulations were formed in low shear blending equipment in a ribbon blender. The perlite aggregate was the first ingredient added with the blender off and subsequent ingredients were added with the blender on. The perlite is added first because of blending difficulties due to its light weight and its silicone treatment.

The typical weight of regular EIFS finishes is about 70.0 lbs. per five-gallon pail. The theoretical weight of five gallons of the regular finishes shown is above 80 lbs. The discrepancy is because such finishes normally entrain a certain amount of air in the mixture that makes the apparent density slightly less than theoretical. The same is true for the lightweight aggregate formulations; the theoretical weight is slightly more because the inevitable air entrapment is not accounted for in the theoretical calculation. The formulations are listed in Table 5 and Table 6 below:

TABLE 5

| | A | | B | |
|---|---|---|---|---|
| Ingredient | Lbs. | Gallons | Lbs. | Gallons |
| Perlite-Silicone Cryogenic | — | — | 2.20 | 1.75 |
| Base Formula | 24.16 | 2.36 | 25.40 | 2.48 |
| Coarse Filler | 3.96 | 0.18 | — | — |
| Odorless Mineral Spirits | — | — | 0.43 | 0.07 |

TABLE 5-continued

| Ingredient | A Lbs. | A Gallons | B Lbs. | B Gallons |
|---|---|---|---|---|
| Water | 0.86 | 0.10 | 0.58 | 0.07 |
| Medium Silica Sand | 39.60 | 1.80 | 13.86 | 0.63 |
| Fine Silica Sand | 12.32 | 0.56 | — | — |
| TOTAL | 80.90 | 5.00 | 42.47 | 5.00 |

TABLE 6

| Ingredient | C Lbs. | C Gallons | D Lbs. | D Gallons |
|---|---|---|---|---|
| Perlite-Silicone Industrial A | — | — | 3.15 | 1.75 |
| Heavyweight Base Formula | 23.96 | 2.34 | 25.40 | 2.48 |
| Coarse Filler | 3.96 | 0.18 | — | — |
| Odorless Mineral Spirits | — | — | 0.43 | 0.07 |
| Water | 0.86 | 0.10 | 0.58 | 0.07 |
| Coarse Silica Sand | 30.58 | 1.39 | 13.86 | 0.63 |
| Medium Silica Sand | 15.40 | 0.70 | — | — |
| Fine Silica Sand | 5.94 | 0.27 | — | — |
| TOTAL | 80.90 | 5.00 | 43.42 | 5.00 |

The overall result of the formation of the lightweight finishes indicated that the use of perlite aggregate in finish formulas had a significant beneficial effect with regard to the weight of the finish. Each of examples A–D showed acceptable flowability and spreadability.

EXAMPLE 2

A fluorescent ultraviolet exposure accelerated weathering test was completed on various base tints and a white prototype of the lightweight finish formula. The test conducted corresponds with ASTM G-154, which sets forth basic principles about testing specimens that are exposed to fluorescent ultraviolet light under controlled environmental conditions. The lightweight formula used a significant amount of perlite aggregate. Tints and a white composition from an existing formula were tested as controls. The test was run for a total of 6,000 hours. The testing cycle was four hours ultraviolet light at 70° C. alternating with four hours of condensation at 50° C. The tints were one percent of each colorant in the base formulation in both the control and the present base formulation.

TABLE 7

| | Color Difference After 6,000 hours QUV vs. Unexposed | | | |
|---|---|---|---|---|
| Sample | ΔL | Δa | Δb | ΔE |
| Control White | −0.02 | +0.22 | +0.71 | 0.74 |
| Lightweight White | −0.42 | +0.12 | +0.88 | 0.99 |
| Control Black Tint | +2.39 | −0.38 | −0.70 | 2.52 |
| Lightweight Black Tint | −1.36 | −0.18 | −0.43 | 1.44 |
| Control Yellow Tint | +0.03 | +0.08 | −1.56 | 1.56 |
| Lightweight Yellow Tint | −1.33 | +0.80 | −0.67 | 1.69 |
| Control Red Tint | +0.41 | −2.38 | −2.1 | 3.20 |

TABLE 7-continued

| | Color Difference After 6,000 hours QUV vs. Unexposed | | | |
|---|---|---|---|---|
| Sample | ΔL | Δa | Δb | ΔE |
| Lightweight Red Tint | −1.55 | −0.69 | −1.08 | 2.01 |
| Control Blue Tint | +2.50 | +1.46 | +6.81 | 7.40 |
| Lightweight Blue Tint | +2.40 | +1.78 | +8.29 | 8.81 |

The overall result of the of the ultraviolet weathering test indicated that the use of perlite aggregate in a finish formula to produce a lightweight finish did not have a significant detrimental effect with regard to the performance of the finish.

EXAMPLE 3

In order to show the benefits of a lightweight aggregate having a water resistant coating, a control experiment was conducted comparing the coated aggregate versus an aggregate that did not have a coating. The experiment was conducted using a silicone coated cryogenically formed perlite versus a nonevacuated cryogenic perlite. The non-evacuated cryogenic and low temperature perlite is available from the Schundler Company of New Jersey. The nonevacuated perlite insulation (the non-silicone coated perite) generally exhibits a range of densities that exhibit low thermal conductivity, however, the normal recommended range is 3 to 4.5 lbs/ft$^3$ (48 to 72 kg/m$^3$). Typical physical properties of nonevacuated perlite cryogenic and low temperature insulation available from the Schundler Company are listed below:

TABLE 8

| Nonevacuated Perlite Cryogenic and Low Temperature Insulation | |
|---|---|
| Density | 3 to 6 lb/ft$^3$ |
| Sieve Analysis in % Wt Retained | Max. 10% + 16 mesh (1.18 mm) |
| | Min. 50% + 100 mesh (0.15 mm) |
| Thermal Conductivity (Low Temperature Applications at mean Temperature −40° C. or −40° F.) | 0.24–0.27 Btu · in/h · ft$^3$ (0.035–0.039 W/m · K) |
| Thermal Conductivity (Nonevacuated Cryogenic Applications at mean Temperature −195° C. or −126° F.) | 0.17–0.20 Btu · in/h · ft$^3$ (0.025–0.029 W/m · K) |

The silicone coating of the perlite particles is desirable to prevent absorption of water while in a water based formula and consequent rise in the viscosity of the formula. In order to show the benefit of the silicone coating of the perlite particles, a 'heat age' test was conducted. A heat age test involves placing a pint of the finish that has been tested for viscosity, density and pH into an oven at an elevated temperature for a number of days. The properties are monitored for stability. The test is an indication of how stable a formulation will be for long-term storage.

The experimentation was conducted between the Grace ETI Silicone Cryogenic Perlite aggregate versus the Heavy Cryogenic from Schundler. The results, listed in the table below, display the improved finish characteristics of using a silicone encapsulated perlite versus using simply a heavy cryogenic perlite:

TABLE 9

| Ingredients | A | B | C | D |
|---|---|---|---|---|
| Stock Formulation | 0.9283 | 0.9283 | 0.9283 | 0.9283 |
| Extendospheres | 0.0640 | 0.0000 | 0.0320 | 0.0320 |
| Fine Silica Sand | 0.4192 | 0.4779 | 0.4486 | 0.4486 |
| Perlite Heavy Cryogenic | 0.0376 | 0.0429 | 0.0402 | — |
| Perlite Silicone Cryogenic | — | — | — | 0.0402 |
| TOTAL | 1.4491 | 1.4491 | 1.4491 | 1.4491 |

Composition A of Table 9 exhibited a viscosity of 106 PU at 9.36 pounds per gallon. That composition displayed a sticky texture which showed wormholes and also noticeable read through spots. Composition B of Table 9 spread better than composition A, displaying a more sandy appearance with fewer worm holes and almost no read through spots. Composition B exhibited a viscosity of 103 PU at 9.63 pounds per gallon. Composition C of Table 9 exhibited physical properties that were similar to composition B, with a viscosity of 103 PU at 9.24 gallons per pound. Composition D was formulated with Grace ETI Silicone Cryogenic, replacing the Heavy Cryogenic from Schundler that was used in compositions A–C of Table 9. Composition D spread best of all of the above compositions, exhibiting a viscosity of 100 PU at 9.73 pounds per gallon.

The heat aging test was conducted to also determine the difference that the silicone encapsulated perlite would have versus the untreated perlite. This was accomplished using the compositions C and D from Table 9. As can be seen from the results of Table 10, use of the silicone encapsulated perlite exhibited physically superior results versus the heavy cryogenic that is traditionally used.

TABLE 10

| | Day | | | | | | | | |
|---|---|---|---|---|---|---|---|---|---|
| | 0 | | | 1 | | | 10 | | |
| | Viscosity (PU) | Density (lbs/gal) | pH | Viscosity (PU) | Density (lbs/gal) | pH | Viscosity (PU) | Density (lbs/gal) | pH |
| C | 103 | 9.24 | 8.94 | Unstable | | | — | — | — |
| D | 100 | 9.73 | 8.96 | 100 | 9.31 | 8.90 | 102 | 9.71 | 8.66 |

The invention has been described with reference to the preferred embodiments. Obviously, modifications and alterations will occur to others upon reading and understanding the preceding detailed description. It is intended that the invention be construed as including all such modifications and alterations insofar as they come within the scope of the appended claims or the equivalents thereof.

The invention is now claimed to be:

1. A coating composition comprising:
   a resin dispersion; and
   an aggregate including a water resistant finish, wherein the coating composition is suitable for use as a textured finish for exterior installation and finish systems ("EIFS").

2. The coating of claim 1 wherein the aggregate is selected from perlite, hyperlite, vermiculite, fly ash, expanded clay, pumice stone powder and mixtures thereof.

3. The coating of claim 1 wherein the aggregate includes perlite.

4. The coating of claim 1 wherein the resin is selected from styrene-butadiene, polyvinyl acetate, acrylic and mixtures thereof.

5. The coating of claim 1 wherein the resin comprises acrylic.

6. The coating of claim 1 wherein the aggregate is a silicone coated cryogenically formed perlite.

7. The coating of claim 1 wherein said resin dispersion comprises between about 10 to about 30% by weight resin.

8. The coating of claim 1 wherein said resin dispersion comprises at least about 10% by weight of the coating composition.

9. The coating of claim 1 wherein said aggregate comprises at least about 4% of said composition.

10. The coating of claim 1 further comprising water.

11. The coating of claim 1 wherein the aggregate is porous.

12. A finish composition comprising:
    about 4% to about 10% by weight of a aggregate selected from the group consisting of: perlite, vermiculite, hyperlite, fly ash, expanded clay, pumice stone powder and mixtures thereof;
    about 10% by weight to about 30% by weight of a resin dispersion; and
    less than about 10% by weight water.

13. The finish composition of claim 12 wherein said aggregate includes a silicone coating.

14. A method for forming a finish composition comprising the steps of:
    coating an aggregate with a water resistant material; and
    mixing said aggregate with a resin dispersion.

15. The method of claim 14 wherein the aggregate comprises perlite.

16. A method of finishing a wall comprising the steps of:
    coating an aggregate with a water resistant encapsulant;
    mixing said coated aggregate with a resin dispersion to form a composition; and
    applying said composition to said wall.

17. The method of claim 16 wherein the aggregate is selected from perlite, vermiculite, hyperlite, fly ash, expanded clay, pumice stone powder and mixtures thereof.

18. The method of claim 16 wherein the resin dispersion is selected from styrenebutadiene, polyvinyl acetate, acrylic and mixtures thereof.

19. The method of claim 16 where the composition is applied to the building wall using a trowel.

20. The method of claim 16 where the composition is applied to the building wall using a spray gun or hopper gun.

21. The coating composition of claim 1, wherein the aggregate includes a mixture of perlite and silica sand.

22. The coating composition of claim 21, wherein the aggregate comprises from about 40 to about 50 percent by volume of the coating composition.

23. The coating composition of claim 1, wherein the coating composition has a weight of about 4- to about 5-pounds per five gallons.

24. The coating compositions of claim 1, wherein perlite comprises about 35 percent by volume of the coating composition.

* * * * *